US011522662B2

(12) United States Patent
Mittal et al.

(10) Patent No.: US 11,522,662 B2
(45) Date of Patent: Dec. 6, 2022

(54) METHOD AND USER EQUIPMENT FOR GENERATING A CHANNEL STATE INFORMATION FEEDBACK REPORT INCLUDING JOINTLY ENCODED PARAMETERS FROM MULTIPLE LAYERS

(71) Applicant: Lenovo (Singapore) Pte. Ltd., New Tech Park (SG)

(72) Inventors: Udar Mittal, Rolling Meadows, IL (US); Ahmed Hindy, Forest Park, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 274 days.

(21) Appl. No.: 16/863,387

(22) Filed: Apr. 30, 2020

(65) Prior Publication Data
US 2021/0344471 A1 Nov. 4, 2021

(51) Int. Cl.
 *H04L 5/00* (2006.01)
 *H04B 7/06* (2006.01)
 *H04L 1/00* (2006.01)

(52) U.S. Cl.
 CPC ......... *H04L 5/0053* (2013.01); *H04B 7/0626* (2013.01)

(58) Field of Classification Search
 CPC ... H04L 5/0053; H04L 1/0029; H04L 1/0026; H04B 7/0626; H04B 7/0658; H04B 7/063
 See application file for complete search history.

(56) References Cited

U.S. PATENT DOCUMENTS

| 11,006,415 | B2* | 5/2021 | Yerramalli | H04B 1/713 |
|---|---|---|---|---|
| 11,277,238 | B2* | 3/2022 | Chen | H04L 5/0007 |
| 2002/0016945 | A1* | 2/2002 | Sayood | H03M 13/47 |
| | | | | 714/779 |
| 2006/0188095 | A1* | 8/2006 | Jung | H04L 9/304 |
| | | | | 380/46 |

(Continued)

OTHER PUBLICATIONS

3GPP TS 38.212 V16.0.0 (Dec. 2019), 3rd Generation Partnership Project; Technical Specification Group Radio Access Network; NR; Multiplexing and channel coding (Release 16), 141 pages.
(Continued)

*Primary Examiner* — Diane L Lo
*Assistant Examiner* — Abusayeed M Haque
(74) *Attorney, Agent, or Firm* — Loppnow & Chapa (57) ABSTRACT

A method and user equipment are provided for generating a channel state information feedback report, which has multiple layers, from channel state information associated with each of the multiple layers including at least one parameter, which is commonly present in the channel state information associated with each of the multiple layers. Each commonly present parameter in each of the multiple layers has a respective value. A set of reference signals transmitted from a network entity are received and observed channel characteristics are organized, based on the received set of reference signals, into the multiple layers of channel state information. From the at least one parameter, which is commonly present in each of the multiple layers, selecting one or more parameters from which a respective index value can be derived for each of the multiple layers. The derived respective index values are jointly encoded, and the channel state information feedback report is formulated, which includes the jointly encoded derived index values, and the channel state information of each of the multiple layers, exclusive of the selected one or more parameters from which the respective index value for each of the multiple layers has been derived.

16 Claims, 6 Drawing Sheets

(56) References Cited

U.S. PATENT DOCUMENTS

| | | | | |
|---|---|---|---|---|
| 2011/0096830 | A1* | 4/2011 | Ashley | H03M 7/3082 |
| | | | | 375/E7.076 |
| 2013/0122953 | A1* | 5/2013 | Zhang | H04W 24/02 |
| | | | | 455/517 |
| 2013/0148749 | A1* | 6/2013 | Mittal | G10L 19/038 |
| | | | | 375/259 |
| 2017/0090764 | A1* | 3/2017 | Lien | G06F 21/316 |
| 2018/0006699 | A1* | 1/2018 | Enescu | H04B 7/0626 |
| 2021/0234595 | A1* | 7/2021 | Zhang | H04B 7/0632 |
| 2021/0306041 | A1* | 9/2021 | Gao | H04B 7/0478 |
| 2021/0385037 | A1* | 12/2021 | Yoon | H04W 74/0808 |

OTHER PUBLICATIONS

3GPP TS 38.214 V16.1.0 (Mar. 2020), 3rd Generation Partnership Project; Technical Specification Group Radio Access Network; NR; Physical layer procedures for data (Release 16), 151 pages.

Hung, A. et al., "Error-Resilient Pyramid Vector Quantization for Image Compression", IEEE Transactions on Image Processing, vol. 7, No. 10, Oct. 1998, pp. 1373-1386.

Mittal, U. et al., "Coding Pulse Sequences Using a Combination of Factorial Pulse Coding and Arithmetic Coding", IEEE 2010 International Conference on Signal Processing and Communications (SPCOM), Bangalore, 2010, pp. 1-5.

Samsung et al., "WF on Type I and II CSI codebooks", R1-1709232, for 3GPP TSG RAN WG1 #89, Hangzhou, China, May 15-19, 2017.

PCT International Search Report for PCT/IB2021/052450, Lenovo (Singapore) Pte. Ltd., dated Jun. 21, 2021.

Texas Instruments, "CQI Feedback Reduction Scheme for E-UTRA", R1-074153, for 3GPP TSG RAN WG1 50bis, Shanghai, China, Oct. 8-12, 2007.

Huawei, "Labelling of UE-selected subbands on PUSCH", R1-080182, for TSG RAN WG1 Meeting #51 bis, Sevilla, Spain, Jan. 14-18, 2008.

* cited by examiner

| X \ Y | 1 | 2 | 3 | 4 |
|---|---|---|---|---|
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | 15 | 105 | 455 | 1365 |

| NUMBER OF BITS IN EACH PARAMETER SET (L) | RANK (m) | NUMBER OF BITS CONVENTIONAL METHOD =Lm | NUMBER OF BITS USING THE PROPOSED METHOD | BIT SAVING |
|---|---|---|---|---|
| 3 | 3 | 9 | 7 | 2 |
| 3 | 4 | 12 | 9 | 3 |
| 6 | 3 | 18 | 16 | 2 |
| 6 | 4 | 24 | 20 | 4 |
| 6 | 8 | 48 | 34 | 14 |
| 8 | 3 | 24 | 22 | 2 |
| 8 | 4 | 32 | 28 | 4 |
| 8 | 8 | 64 | 49 | 15 |
| 9 | 3 | 27 | 25 | 2 |
| 9 | 4 | 36 | 32 | 4 |
| 9 | 8 | 72 | 57 | 15 |

METHOD AND USER EQUIPMENT FOR GENERATING A CHANNEL STATE INFORMATION FEEDBACK REPORT INCLUDING JOINTLY ENCODED PARAMETERS FROM MULTIPLE LAYERS

FIELD OF THE INVENTION

The present disclosure is directed to a method and apparatus for generating a channel state information feedback report, which has multiple layers, including jointly encoding parameters selected from the multiple layers.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In an effort to enhance system performance, more recent standards have looked at different forms of spatial diversity including different forms of multiple input multiple output (MIMO) systems, which involve the use of multiple antennas at each of the source and the destination of the wireless communication for multiplying the capacity of the radio link through the use of multipath propagation. Such a system makes increasingly possible the simultaneous transmission and reception of more than one data signal using the same radio channel.

As part of supporting MIMO communications, user equipment can make use of channel state information codebooks, which help to define the nature of the adopted beams, which are used to support a particular data connection. Higher rank codebooks, where the rank relates to the total number of layers, can sometimes be used to enhance system performance, but often at the price of an increase in the amount of feedback overhead.

In at least some wireless communication systems, channel state information (CSI) feedback is used to report on current channel conditions. This can be increasingly useful in frequency division duplexing (FDD) and frequency division multiple access (FDMA) systems where the downlink (DL) and uplink (UL) channels are not reciprocal. With multi-user (MU)-MIMO and spatial multiplexing, a receiving device, such as a user equipment (UE), may need to report channel conditions for multiple channels or beams. Accordingly, a meaningful amount of overhead may be dedicated to CSI reporting in MU-MIMO and spatial multiplexing systems.

The present inventors have recognized that improved methods for efficiently coding a channel state information feedback report may be beneficial, as well as apparatuses and systems that perform the functions of the methods. The present inventors have further recognized that one such method, which includes channel state information feedback reports that have multiple layers, can include identified types of information which is commonly present in each of the layers that can have respectively associated values that are jointly encoded. In turn, these values can be excluded from the information associated with their respective layers, when the corresponding information for each of the layers is separately included in the channel state information feedback report.

SUMMARY

The present application provides a method in a user equipment for generating a channel state information feedback report, which has multiple layers, from channel state information associated with each of the multiple layers including at least one parameter, which is commonly present in the channel state information associated with each of the multiple layers. Each commonly present parameter in each of the multiple layers has a respective value. The method includes receiving a set of reference signals transmitted from a network entity, and organizing observed channel characteristics, based on the received set of reference signals, into the multiple layers of channel state information. From the at least one parameter, which is commonly present in each of the multiple layers, selecting one or more parameters from which a respective index value can be derived for each of the multiple layers. The derived respective index values are jointly encoded, and the channel state information feedback report is formulated, which includes the jointly encoded derived index values, and the channel state information of each of the multiple layers, exclusive of the selected one or more parameters from which the respective index value for each of the multiple layers has been derived.

According to another possible embodiment, a user equipment for generating a channel state information report is provided, which has multiple layers, from channel state information associated with each of the multiple layers including at least one parameter, which is commonly present in the channel state information associated with each of the multiple layers. Each commonly present parameter in each of the multiple layers has a respective value. The user equipment includes a transceiver that receives a set of reference signals transmitted from a network entity. The user equipment further includes a controller that organizes observed channel characteristics, based on the received set of reference signals, into the multiple layers of channel state information, and selects from the at least one parameter, which is commonly present in each of the multiple layers, one or more parameters from which a respective index value can be derived for each of the multiple layers. The controller jointly encodes the derived respective index values, and formulates the channel state information feedback report, which includes the jointly encoded derived index values, and the channel state information of each of the multiple layers, exclusive of the selected one or more parameters from which the respective index value for each of the multiple layers has been derived.

According to a further possible embodiment, a method in a network entity for generating a channel state information feedback report, which has multiple layers, from channel state information associated with each of the multiple layers including at least one parameter, which is commonly present in the channel state information associated with each of the multiple layers. Each commonly present parameter in each of the multiple layers has a respective value. The method includes generating a set of reference signals, and transmitting the set of reference signals, which are received by at least one user equipment. A channel state information feedback report is received from the at least one user equipment, where the feedback report has been generated by organizing observed channel characteristics, based on the set of reference signals, into the multiple layers of channel state information, and selecting from the at least one parameter, which is commonly present in each of the multiple layers, one or more parameters from which a respective index value can be derived for each of the multiple layers. The derived respective index values are jointly encoded, and the channel state information feedback report, which includes the jointly encoded derived index values, and the channel state information of each of the multiple layers, exclusive of the selected one or more parameters from which the respective index value for each of the multiple layers has been derived is formulated.

According to a still further possible embodiment, a network entity for generating a channel state information feedback report, which has multiple layers, from channel state information associated with each of the multiple layers including at least one parameter, which is commonly present in the channel state information associated with each of the multiple layers. Each commonly present parameter in each of the multiple layers has a respective value. The network entity includes a controller that generates a set of reference signals, and a transmitter that transmits the set of reference signals, which are received by at least one user equipment, and receives a channel state information feedback report from the at least one user equipment, where the feedback report has been generated by organizing observed channel characteristics, based on the set of reference signals, into the multiple layers of channel state information, and selecting from the at least one parameter, which is commonly present in each of the multiple layers, one or more parameters from which a respective index value can be derived for each of the multiple layers. The derived respective index values are jointly encoded, and the channel state information feedback report, which includes the jointly encoded derived index values, and the channel state information of each of the multiple layers, exclusive of the selected one or more parameters from which the respective index value for each of the multiple layers has been derived is formulated.

These and other features, and advantages of the present application are evident from the following description of one or more preferred embodiments, with reference to the accompanying drawings.

DETAILED DESCRIPTION OF THE PREFERRED EMBODIMENT(S)

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for generating a channel state information report which has multiple layers, including jointly encoding parameters selected from the multiple layers.

Figure 1:
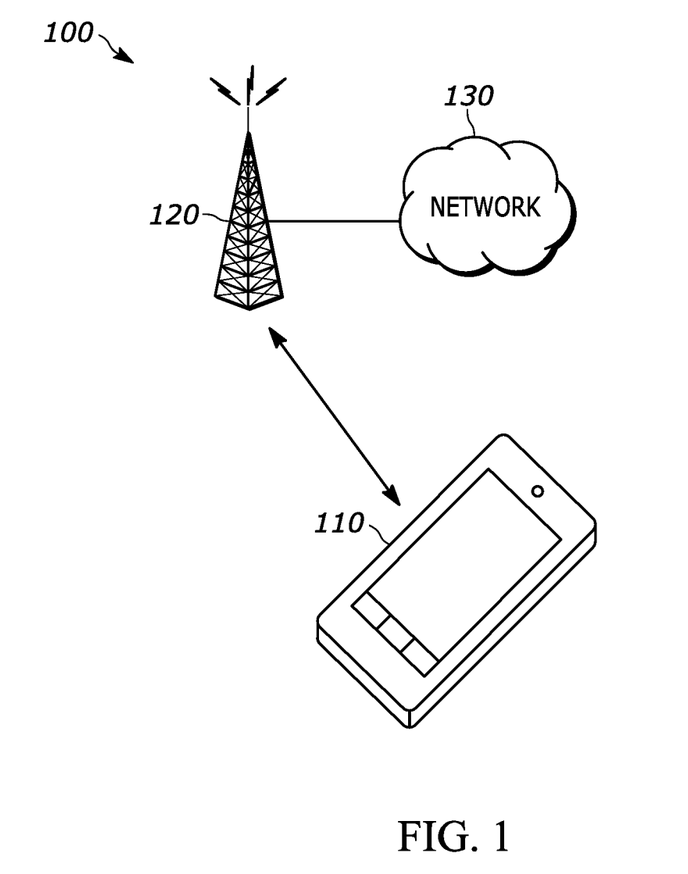
FIG. 1 is a block diagram of an exemplary network environment in which the present invention is adapted to operate.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

Multiple-input and multiple-output (MIMO) systems have a throughput advantage over a single input single output system. However, the advantage generally comes if a transmitter (gNB in downlink channel) has knowledge of the downlink channel at various frequency bands. The observed channel characteristics can be fed back by the receiver by first observing reference signals or pilot signals and then transmitting feedback information about the channel to the transmitter based on the observed reference signals and/or pilot signals. This feedback is referred to as channel state information (CSI) feedback and the reference signals (RS) are called CSI-RS. There is a tradeoff between the amount of CSI feedback and the system throughput. In CSI feedback design, at least one potential overarching aim is to decrease the amount of feedback information while attempting to minimize the impact on throughput. This can be done in some instances by either decreasing the number of parameters included in the CSI feedback or using fewer bits for the CSI feedback or using fewer bits to code the CSI feedback parameters.

Let H be an Nrx×Ntx channel matrix observed by the UE for each resource block (RB) using reference signals where there may be a distinct reference signal for each transmitting antenna port and each RB. Let W be an Ntx×L beam space matrix, where Nrx is the number of receive antenna ports, Ntx is the number of transmit antenna ports, and L is the number of vectors in the beam space matrix. In Type-II CSI feedback, the UE feeds back a beam space matrix W of size (Ntx×L) and feeds back the linear transformation coefficients $\alpha_f$ for each layer and each RB or a group of resource blocks (subbands) such that the precoding vector for a transmitting layer is given by:

$$v_f = W\alpha_f \qquad (1)$$

The coefficients $\alpha_f$ are either directly fed back or is first transformed using DFT (Discrete Fourier Transform) and then the DFT coefficients are fed back as in a Rel. 16 Type-II codebook. The DFT based approach generally decreases the size of the CSI feedback.

The feedback in equation (1) is for a single layer. The precoding matrices based on NR codebooks for Rel. 15, as well as Rel. 16, often have multiple layers. For feedback of multiple layers, some of the parameters are common to all the layers and the remaining parameters are independent from one layer to another. One parameter that is common to multiple layers is the parameter representing the beam space matrix W. Other parameters may be coded independently for different layers, such that from the parameter set (at least for RI≤4 in which all layers are mapped to the same codeword) alone it will not be possible to identify whether this parameter set belongs to the first layer or the last layer. Only the ordering of the parameter set may make it possible to identify which layer this parameter set belongs to. For example, in Rel. 15 codebook, each layer is coded using a separate set of wideband (WB) amplitudes, sub-band (SB) amplitudes, and set of SB phase indicators. Whereas for Rel. 16 codebook, each layer is coded using a separate set of non-zero tap coefficients' amplitude and phase indicators, where a bitmap indicating the non-zero coefficients and an indicator of the strongest coefficient, i.e., the coefficient with the largest amplitude value, per layer are also reported. As an example, the set of layer-dependent CSI feedback parameters with the same bitwidth across layers in eType-II codebook, such as defined in the 3GPP NR technical specification 38.214, V16.1.0, Section 5.2.2.2.5 include the following: $i_{1,6,j}$, $i_{1,7,j}$, $i_{1,8,j}$, $i_{2,3,j}$, $i_{2,5,j}$ and $i_{2,5,j}$ for layer j.

As mentioned before, the ordering of the parameter set in the coded stream constituting the CSI feedback report may be the only way to identify which layer a particular parameter set represents. The standard, e.g., 3GPP standard, also may not provide any significance of the first layer over the other layers. In some instances, it is possible that during scheduling there could be some advantage of ordering the layers, such as from best to worst, as the scheduler/gNb might be able to more easily downgrade the rank of a UE by removing higher layers, i.e., layers that are created last, and keeping lower layers, i.e., layers that are created first. In doing so, since the lower layers may have a better quality than higher layers, the gNb may make a pessimistic assumption when assuming that the estimated average SNR of lower layers is equal to the average SNR over all the layers. There is an optional layer indicator parameter which can be used to identify the best layers and this can enable gNb to perform rank downgrading, if needed.

However currently, there does not appear to be any significance attached to the order of the layers. We can currently randomly permute the order in which a different layer's information is listed in the CSI feedback report and still conform to the standard.

Bearing this in mind, the present inventors have recognized that at least one question might include, whether it might be possible to permute the layers of information in a channel state information feedback report in a way, where the parameters of the layers are encoded without having any loss, while at the same time saving some bits in the encoding?

A method of ordering the layers of a precoding matrix is herein presently proposed where the ordering of layers can be based on the index values of a set of parameters for each layer, where in at least some instances at least some bits can be saved in the encoding.

In accordance with at least one embodiment, the presently proposed approach is, as follows:

For Encoding:

Assume the CSI feedback report includes information for m layers, each having at least K parameters $\beta_{ij}$, $0 \le i \le K-1$, and $1 \le j \le m$, with parameter $\beta_{ij}$ using $l_i$ bits for each layer j. Note that the number of bits per parameter is independent of the layer index. For each layer, a sequence of bits is generated by concatenating the parameters $\beta_{ij}$ $$\bar{q}_j = [\beta_{0,j} \beta_{1,j} \beta_{(K-1),j}]. \qquad (2)$$

Thus, each of the $\bar{q}_j$ sequences has length $L = \Sigma_{i=0}^{K-1} l_i$ bits. Hereafter $\bar{q}_j$ is represented by a decimal value $q_j$ whose range of values is 0 to $2^L - 1$. The parameter $q_j$ can also be obtained using a joint fixed length lossless encoding of $\beta_{ij}$, where L is the length of the joint codeword. This joint encoding may also be useful when $l_i$ is not an integer. As such $l_i$ is a length in bits of $\beta_{ij}$ and while a length in bits not being an integer may seem incorrect, consider the case where each $\beta_{ij} \in [0, \beta_{ij}^{max} - 1]$. In such an instance, $l_i = \log_2(\beta_{ij}^{max})$ may not always be an integer. An example of a joint encoding of $\beta_{ij}$ to obtain $q_j$ is:

$$q_j = \Sigma_{i=0}^{K-1} \beta_{ij} (\Pi_{i=0}^{i-1} \beta_{ij}^{max}), \qquad (3)$$

and the length of this jointly encoded codeword is $L = \Sigma_{i=0}^{K-1} l_i$.

We now order the layers in the ascending order of $q_j$, where ties are broken based on the value of j, i.e., if $q_j = q_{j+t}$, where t>0, list $q_j$ first. Let $j_1, j_2, \ldots, j_m$ be such an ordering. Note that other ordering methods based on the values of $q_j$, as well as other techniques to break the tie in the case, where $q_j$ is the same for two or more layers, are not precluded. Given an ascending ordering, we could modify each $q_{j_s}$ such that $$q_{j_s} \to q_{j_s} + s - 1. \qquad (4)$$

Figure 2:
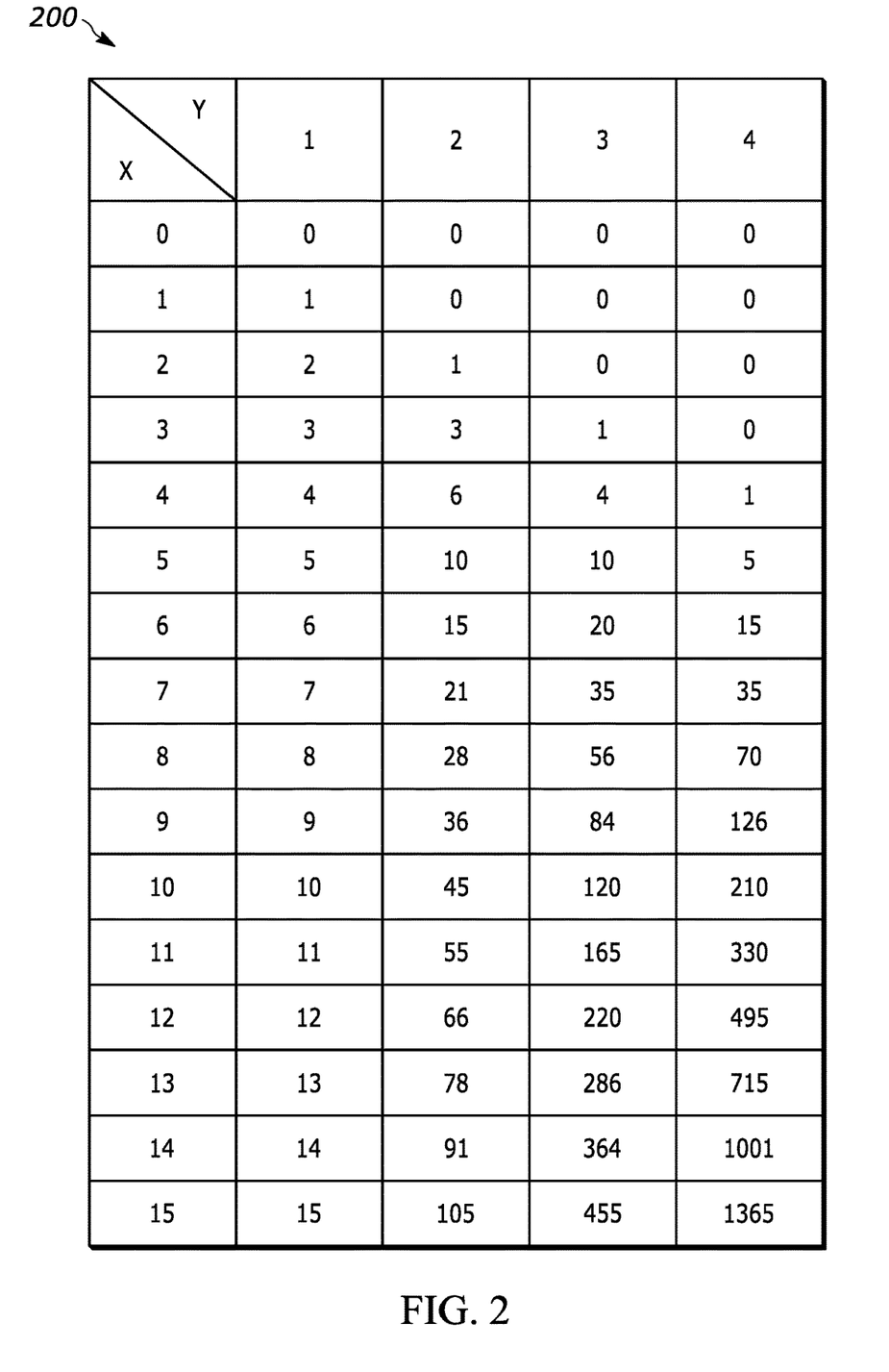
FIG. 2 is a table illustrating the output of a combinatorial function.

This would ensure that as modified all $q_{j_s}$ are in a strictly increasing order, where $q_{j_1} < q_{j_2} \ldots < q_{j_m}$. Once these $q_{j_s}$ values are assigned, we can jointly encode $q_{j_s}$ such that fewer than ml bits are used. Note that the maximum possible value of the largest $q_{j_m}$ is $2^L - 1 + m - 1$ and $q_{j_1} \ge 0$. Thus, jointly encoding all $q_{j_s}$ is equivalent to assigning m boxes out of $2^L - 1 + m$ boxes. These boxes are numbered from 0 to $2^L - 1 + m - 1$. Hence, $\lceil \log_2 C(2^L - 1 + m, m) \rceil$ bits are needed to encode the particular index values included as part of the jointly encoded value, where $$C(n, k) = \frac{n!}{k!(n-k)!}, \qquad (5)$$

is a standard combinatorial function, where $n! = n \times (n-1) \times \ldots \times 1$ for $n \ge 1$, and $0! = 1$. Moreover, $C(n,k)$ is defined to be 0 for k>n. Alternatively, the output of the combinatorial function can be tabulated to reduce computational complexity. For example in the 3GPP NR technical specification 38.214, V16.1.0, Section 5.2.2.2.3, as illustrated in FIG. 2, a table 200 illustrates the output of a combinatorial function, where encoding of $q_{j_s}$ can be performed using a combinatorial method where the jointly encoded codeword is given by:

$$C = \Sigma_{i=1}^{m} C(\Sigma_{s=1}^{i} q_{j_s}, i). \qquad (6)$$

Figure 3:
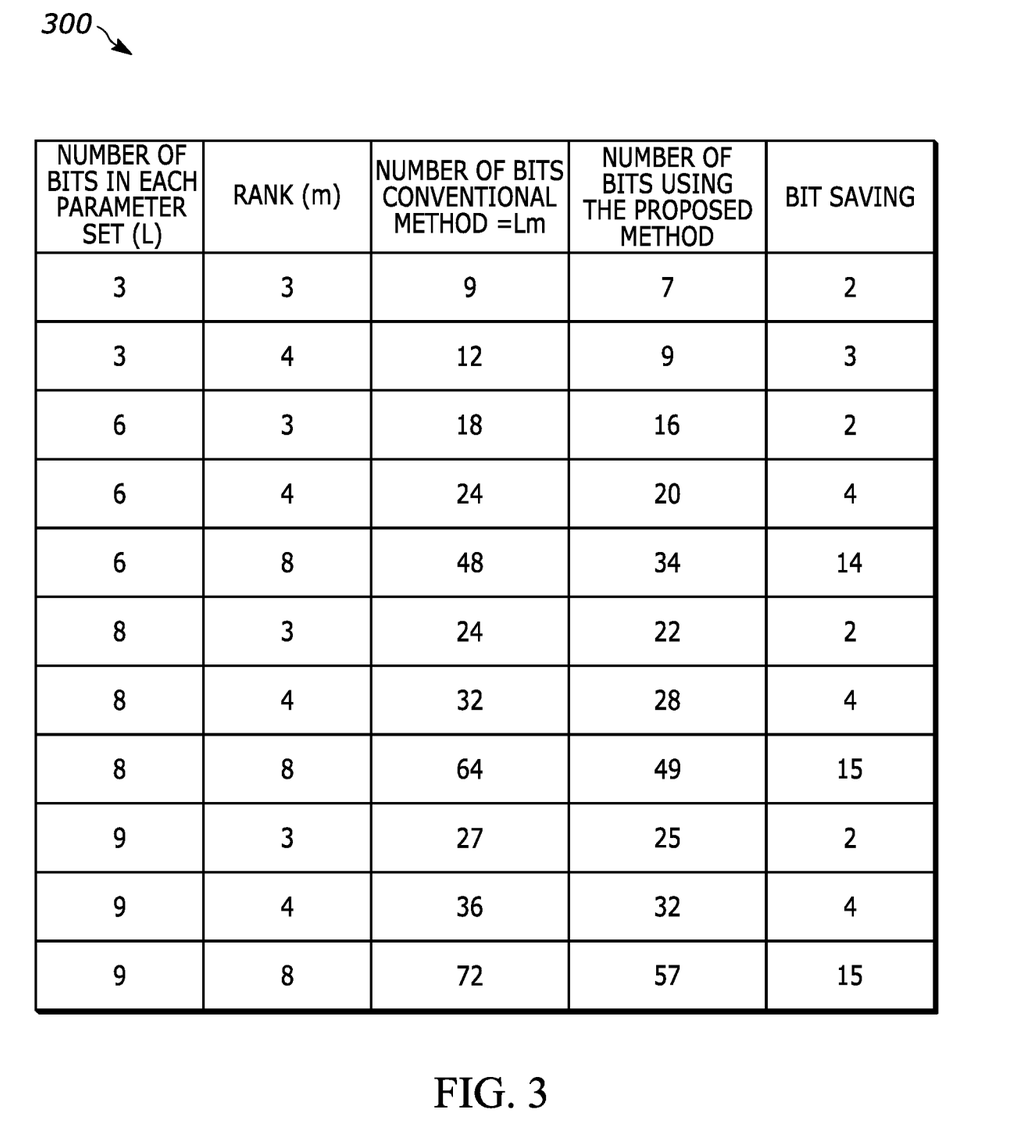
FIG. 3 is a table illustrating the exemplary bit-saving, in accordance with the implementation of at least one embodiment of the present application.

In FIG. 3, a table 300 illustrating the exemplary bit-saving, in accordance with at least one embodiment of the present application, we compare the bits needed to code the above parameters using the conventional method and the proposed method with the combinatorial function.

Other coding methods such as arithmetic coding as outlined in the article "Error-Resilient Pyramid Vector Quantization for Image Compression" in IEEE Transactions on Image Processing, Vol. 7, No. 10, October 1998, by A. C. Hung et al. could also be used. Using this approach, we could start with an initial code space specified by the interval [0,1]. This interval could then be successively divided depending on each bit and its probability within the source sequence. The lower the probability of a sequence, the smaller the interval that is assigned to it. To code a particular bit sequence, any suitable point within the code space interval corresponding to the sequence could be selected, and a binary representation of that point could be used as the codeword. If an approach for jointly encoding $q_{j_s}$ is used then we could make a binary sequence of length $2^L-1+m$, which then has a value of one only at m locations, where all other locations have a value of zero. The probability of 0 and 1 are modified after the coding of each location of a sequence depending on the number of 0s and the number of is remaining in the sequence. The probability of 0 and 1 are then given by $$P(0)=(n-k)/n, P(1)=k/n \qquad (7)$$

where k is the number of ones remaining and n is the length of the sequence remaining to be coded.

For Decoding:

Decoding is generally the reverse of encoding. From the received codeword C, $q_{j_s}$ is obtained using an iterative procedure, such as the approach noted in the article "Coding Pulse Sequences Using a Combination of Factorial Pulse Coding and Arithmetic Coding" in 2010 International Conference on Signal Processing and Communications (SP-COM), Bangalore, 2010, pages 1-5, by Mittal et al. The $q_{j_s}$ are then modified as $q_{j_s}=q_{j_s}-m+1$. The parameters $\beta_{ij}$ for each layer are then extracted for $q_{j_s}$. Note that we generally can not get back the original ordering of the layers. The order is based on the ascending order of $q_{j_s}$.

From FIG. 3, we see that there is a savings of 2 to 15 bits depending on the rank (m) and the number of bits in the parameter set (L). It can be shown that there may not be any saving when m=2. Note this tends to improve with larger m. For example, for m=8, 14 or 15 bits can be saved. It may be worth noting that while the saving may be marginal considering the total number of bits needed to code each layer, which may be on the order hundreds of bits, these savings are generally achieved without any loss of information.

Note that we could have an additional one bit saving for m=2, as well, but in that case we may not be able to get a bit exact solution. In this case, we could modify $q_{j_s}$ as $q_{j_s}=q_{j_s}+s-2$ instead of $q_{j_s}=q_{j_s}+s-1$. Note that this approach may have lowest value of $q_{j_s}=-1$. However, if we select the parameters $\beta_{ij}$ such is that $q_j$ are zero with a very low probability then whenever $q_{j_s}=-1$, we can set it to 0. Now we can use equation (4) again for encoding. The number of bits in this case is given by $\lceil \log_2 C(2^L-2+m, m) \rceil$. It can be seen that, even with m=2, this approach will result in saving of 1 bit.

For forming parameters $q_j$, we can use any set of parameters $\beta_{ij}$ (Eq. 2) which are reported using the same bit-width for each layer and the decoder uses that parameter for decoding the respective layer in an identical way. For example, for a Rel. 15 codebook these parameters could be WB gains, SB gains and SB phase. For Rel. 16 codebook these parameters could be the strongest coefficient indicator, common gain for the other polarization and the non-zero coefficients amplitude and the phase indicators. This can even be some of the bit-map bits of all the layers. Further details of the content of new radio (NR) Rel. 15 and Rel. 16 codebooks can be found in the joint proposal for codebook design presented in "WF on Type I and II CSI codebooks", R1-1709232, 3GPP TSG-RAN WG1 #89, Hangzhou, China, and 3GPP NR technical specification 38.212, V16.0.0, Section 6.3.2.

Regarding codebooks for Rel. 17 and beyond, it is not presently clear whether all codebooks would support multiple layers. However, it is presently anticipated that multiple layers will be supported in a manner similar to Rel. 15 and Rel. 16 codebooks. Therefore, the codebook may have parameters such as coefficients' amplitude and phase indicators as well as bitmap bits per layer. Hence, $q_j$ could be similarly formed for Rel. 17, as well as other instances in which the codebook could employ multiple layers.

Note that there may exist layer-specific parameters that appear in a subset of the layers, wherein this subset does not include all layers. In one embodiment, these parameters are not included in the joint encoding process and are represented by one or more additional indicators. In such situations, the bit length of these additional parameters may be obtained from the jointly encoded parameters. In another embodiment, dummy bits of the same bit length of the aforementioned parameters are appended to the sequence of bits representing the layers that are not a member of that subset of layers. In such a case, the layer-specific parameters that appear in only a subset of the layers may be jointly encoded along with the layer-specific parameters that are common across all layers. The dummy bits may be any predetermined sequence of bits, e.g., all zero bits or all one bits. Note that the latter approach may incur additional overhead due to appending the dummy bits.

Figure 4:
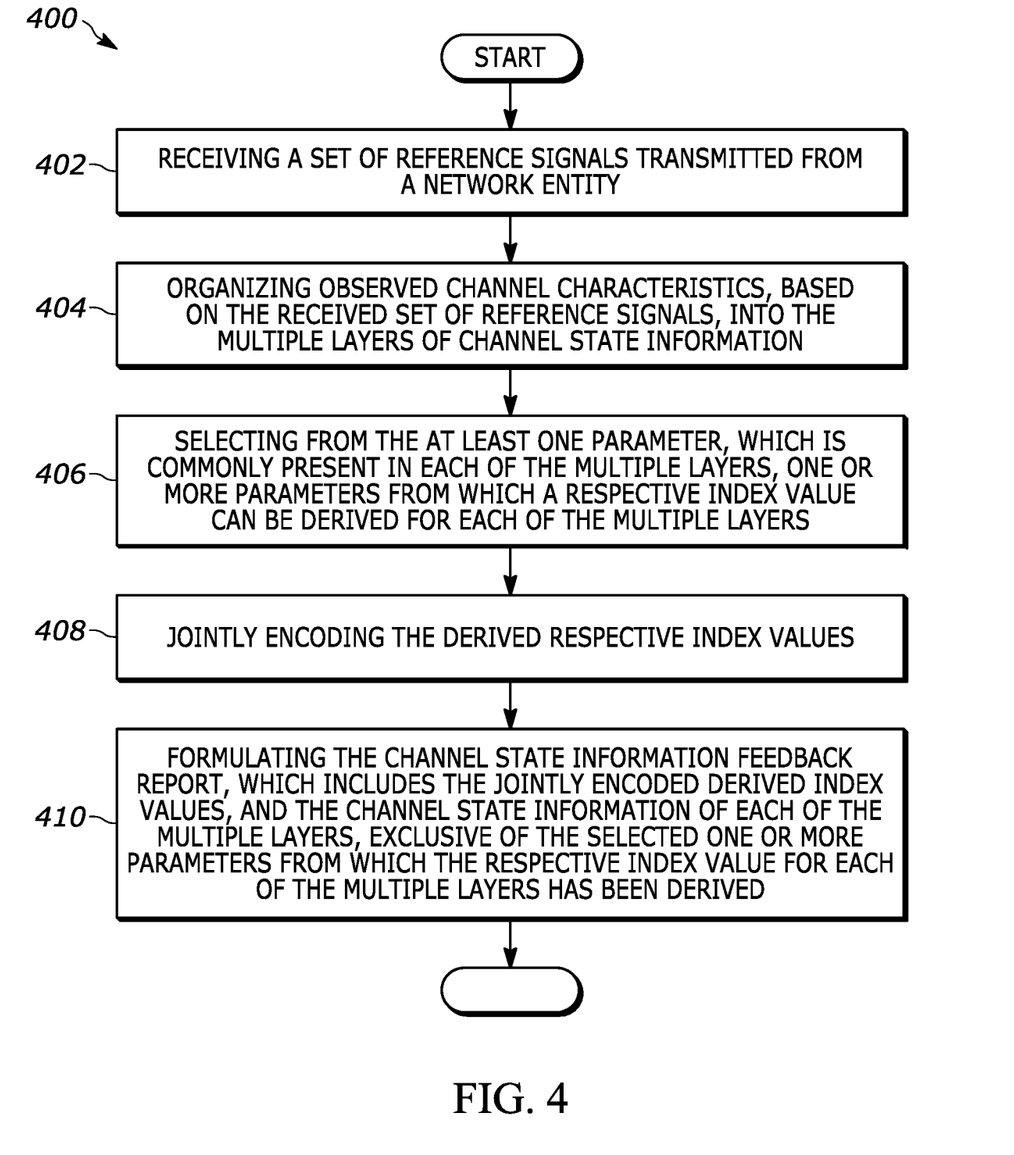
FIG. 4 is a flow diagram in a user equipment for generating a channel state information feedback report including multiple layers, from channel state information associated with each of the multiple layers.

FIG. 4 illustrates a flow diagram 400 in a user equipment for generating a channel state information feedback report including multiple layers, from channel state information associated with each of the multiple layers, including instances in which the multiple layers include at least one parameter, which is commonly present in the channel state information associated with each of the multiple layers. The method includes receiving 402 a set of reference signals transmitted from a network entity, and organizing 404 observed channel characteristics, based on the received set of reference signals, into the multiple layers of channel state information. From the at least one parameter, which is commonly present in each of the multiple layers, selecting 406 one or more parameters from which a respective index value can be derived for each of the multiple layers. The derived respective index values are jointly encoded 408, and the channel state information feedback report is formulated 410, which includes the jointly encoded derived index values, and the channel state information of each of the multiple layers, exclusive of the selected one or more parameters from which the respective index value for each of the multiple layers has been derived.

In some instances, the multiple layers associated with the observed channel characteristics can be reordered based upon the derived respective index value for each of the multiple layers. In some of these instances prior to jointly encoding the derived respective index values, the derived respective index values can be adjusted, based on a position of the corresponding one of multiple layers as reordered for each of the derived respective index values, and the derived respective values used as part of the joint encoding can use the values of the derived respective index values as adjusted. Adjusting the derived respective index values can include adding a parameter value to each of the derived index values, where in some instances the parameter value can correspond to the value of the reordered position for the corresponding one of multiple layers minus a constant value. In some instances, the constant value can be one of one or two, and in some instances, if the adjusted derived index value has a negative value after adjustment, then the adjusted derived index value can be further adjusted to have a non-negative value, which can include a value of zero.

In some instances, the one or more parameters can be jointly encoded into the derived index value per layer.

In some instances, the set of references signals can be associated with a set of beams.

In some instances, a set of vectors of amplitude and phase coefficients' values can be identified from the set of reference signals. In some of these instances, the parameters can be one or more of indicators of the amplitude coefficients' values, indicators of the phase coefficients' values, a bitmap indicator representing the non-zero coefficients' values, an indicator of the strongest coefficient, and an indicator of the frequency domain basis.

In some instances, the joint encoding of the derived respective index values can include an encoding using a combinatorial function. In some of these instances, the combinatorial function includes:

$$C(n, k) = \frac{n!}{k!(n-k)!},$$

where n corresponds to the number of possible values, where k corresponds to the number of possible values selected, and where $n! = n \times (n-1) \times (n-2) \times \ldots 1$, for $n \geq 1$, and $0! = 1$.

In some instances, the joint encoding of the derived respective index values can include an encoding using an arithmetic coding.

In some instances, the formulated channel state information feedback report can be transmitted to the network entity.

Figure 5:
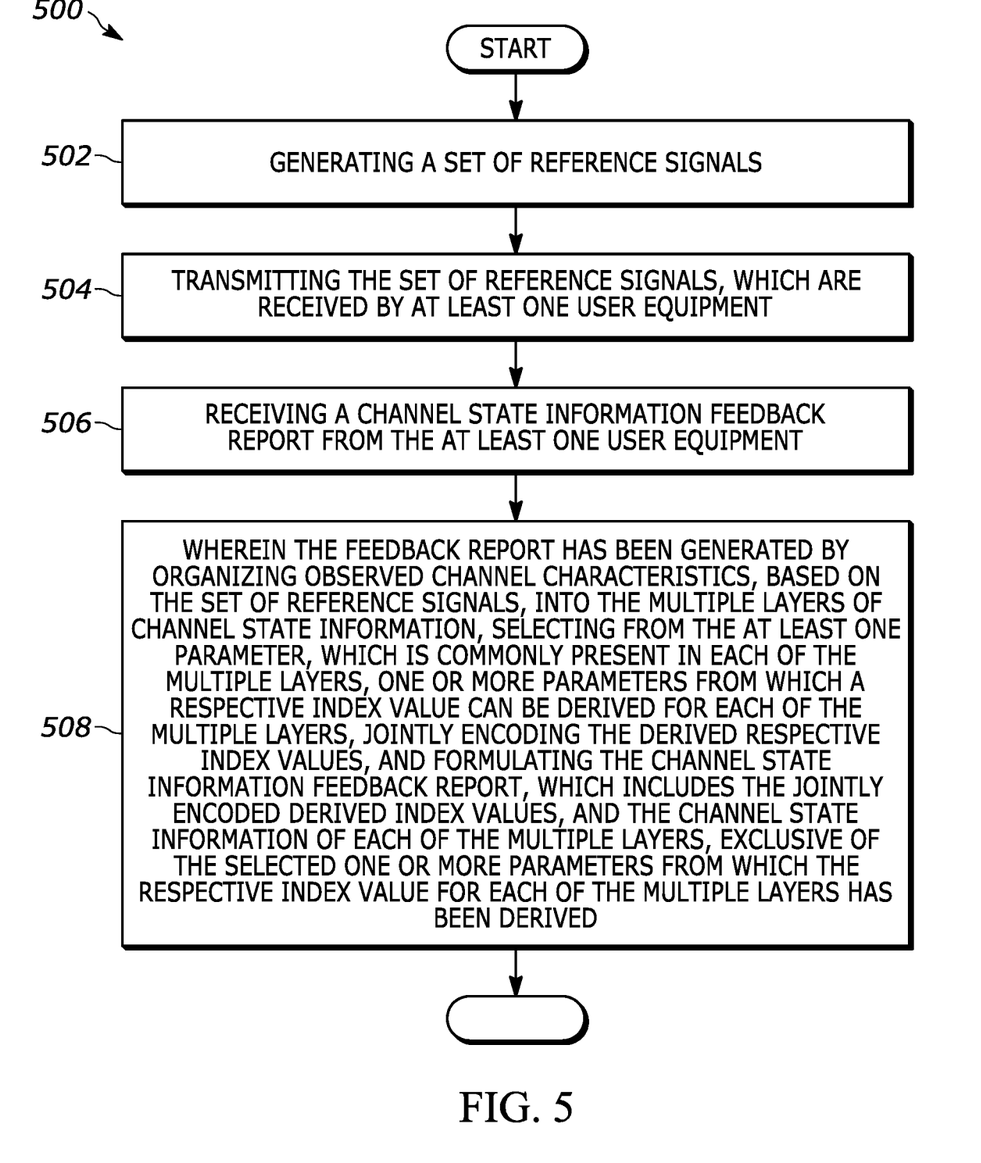
FIG. 5 is a flow diagram in a network entity for generating a channel state information feedback report including multiple layers, from channel state information associated with each of the multiple layers.

FIG. 5 illustrates a flow diagram 500 in a network entity for generating a channel state information feedback report, which has multiple layers, from channel state information associated with each of the multiple layers including at least one parameter, which is commonly present in the channel state information associated with each of the multiple layers. Each commonly present parameter in each of the multiple layers has a respective value. The method includes generating 502 a set of reference signals, and transmitting 504 the set of reference signals, which are received by at least one user equipment. A channel state information feedback report is received 506 from the at least one user equipment, where the feedback report has been generated 508 by organizing observed channel characteristics, based on the set of reference signals, into the multiple layers of channel state information, and selecting from the at least one parameter, which is commonly present in each of the multiple layers, one or more parameters from which a respective index value can be derived for each of the multiple layers. The derived respective index values are jointly encoded, and the channel state information feedback report, which includes the jointly encoded derived index values, and the channel state information of each of the multiple layers, exclusive of the selected one or more parameters from which the respective index value for each of the multiple layers has been derived is formulated.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
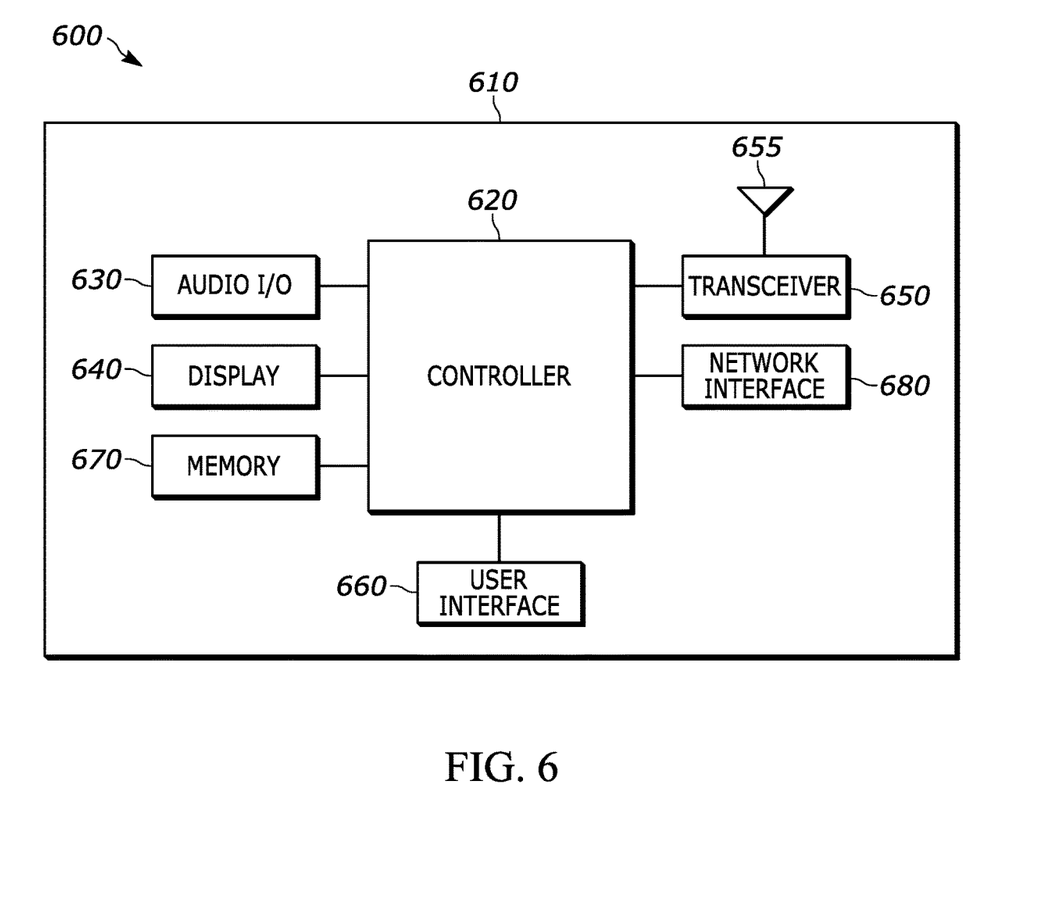
FIG. 6 is an example block diagram of an apparatus according to a possible embodiment.

FIG. 6 is an example block diagram of an apparatus 600, such as the wireless communication device 110, according to a possible embodiment. The apparatus 600 can include a housing 610, a controller 620 within the housing 610, audio input and output circuitry 630 coupled to the controller 620, a display 640 coupled to the controller 620, a transceiver 650 coupled to the controller 620, an antenna 655 coupled to the transceiver 650, a user interface 660 coupled to the controller 620, a memory 670 coupled to the controller 620, and a network interface 680 coupled to the controller 620. The apparatus 600 can perform the methods described in all the embodiments.

The display 640 can be a viewfinder, a liquid crystal display (LCD), a light emitting diode (LED) display, a plasma display, a projection display, a touch screen, or any other device that displays information. The transceiver 650 can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 670 can include a random access memory, a read only memory, an optical memory, a solid state memory, a flash memory, a removable memory, a hard drive, a cache, or any other memory that can be coupled to an apparatus.

The apparatus 600 or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 670 or elsewhere on the apparatus 600. The apparatus 600 or the controller 620 may also use hardware to implement disclosed operations. For example, the controller 620 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment for generating a channel state information feedback report including multiple layers, from channel state information associated with each of the multiple layers including at least one parameter, which is commonly present in the channel state information associated with each of the multiple layers, each commonly present parameter in each of the multiple layers having a respective value, the method comprising:
   receiving a set of reference signals transmitted from a network entity;
   organizing observed channel characteristics, based on the received set of reference signals, into the multiple layers of channel state information;
   selecting from the at least one parameter, which is commonly present in each of the multiple layers, one or more parameters from which a respective index value can be derived for each of the multiple layers;
   jointly encoding the derived respective index values; and
   formulating the channel state information feedback report, which includes the jointly encoded derived index values, and the channel state information of each of the multiple layers, exclusive of the selected one or more parameters from which the respective index value for each of the multiple layers has been derived;
   wherein the multiple layers associated with the observed channel characteristics are reordered based upon the derived respective index value for each of the multiple layers;
   wherein prior to jointly encoding the derived respective index values, the derived respective index values are adjusted, based on a position of the corresponding one of multiple layers as reordered for each of the derived respective index values; and
   wherein the derived respective values used as part of the joint encoding use the values of the derived respective index values as adjusted.

2. The method in accordance with claim 1, wherein adjusting the derived respective index values includes adding a parameter value to each of the derived index values.

3. The method in accordance with claim 2, wherein the parameter value corresponds to the value of the reordered position for the corresponding one of multiple layers minus a constant value.

4. The method in accordance with claim 3, wherein the constant value is one of one or two.

5. The method in accordance with claim 3, wherein if the adjusted derived index value has a negative value after adjustment, then the adjusted derived index value is further adjusted to have a non-negative value, which can include a value of zero.

6. The method in accordance with claim 1, wherein the one or more parameters are jointly encoded into the derived index value per layer.

7. The method in accordance with claim 1, wherein the set of references signals are associated with a set of beams.

8. The method in accordance with claim 1, wherein a set of vectors of amplitude and phase coefficients' values are identified from the set of reference signals.

9. The method in accordance with claim 8, wherein the parameters can be one or more of indicators of the amplitude coefficients' values, indicators of the phase coefficients' values, a bitmap indicator representing the non-zero coefficients' values, an indicator of the strongest coefficient, and an indicator of the frequency domain basis.

10. The method in accordance with claim 1, wherein the joint encoding of the derived respective index values includes an encoding using a combinatorial function.

11. The method in accordance with claim 10, wherein the combinatorial function includes:

$$C(n, k) = \frac{n!}{k!(n-k)!},$$

where n corresponds to the number of possible values,
where k corresponds to the number of possible values selected, and
where n!=n×(n−1)×(n−2)× . . . 1, for n≥1.

12. The method in accordance with claim 1, wherein the joint encoding of the derived respective index values includes an encoding using an arithmetic coding.

13. The method in accordance with claim 1, wherein the formulated channel state information feedback report is transmitted to the network entity.

14. A user equipment for generating a channel state information feedback report including multiple layers, from channel state information associated with each of the multiple layers including at least one parameter, which is commonly present in the channel state information associated with each of the multiple layers, each commonly present parameter in each of the multiple layers having a respective value, the user equipment comprising:
 a transceiver that receives a set of reference signals transmitted from a network entity; and
 a controller that organizes observed channel characteristics, based on the received set of reference signals, into the multiple layers of channel state information, and selects from the at least one parameter, which is commonly present in each of the multiple layers, one or more parameters from which a respective index value can be derived for each of the multiple layers;
 wherein the controller jointly encodes the derived respective index values, and formulates the channel state information feedback report, which includes the jointly encoded derived index values, and the channel state information of each of the multiple layers, exclusive of the selected one or more parameters from which the respective index value for each of the multiple layers has been derived;
 wherein the controller further reorders the multiple layers associated with the observed channel characteristics, based upon the derived respective index value for each of the multiple layers;
 wherein prior to the controller jointly encoding the derived respective index values, the derived respective index values are adjusted, based on a position of the corresponding one of multiple layers as reordered for each of the derived respective index values; and
 wherein the derived respective values used as part of the joint encoding use the values of the derived respective index values as adjusted.

15. The user equipment in accordance with claim 14, wherein the joint encoding of the derived respective index values includes an encoding using a combinatorial function.

16. The user equipment in accordance with claim 14, wherein the joint encoding of the derived respective index values includes an encoding using an arithmetic coding.

\* \* \* \* \*